June 8, 1965  C. REYES TERRON  3,187,347
JOINT ARRANGEMENT WITH MULTI-POSITIONAL LOCKING
MEANS FOR A PROSTHETIC SURGICAL APPLIANCE
Filed May 11, 1962
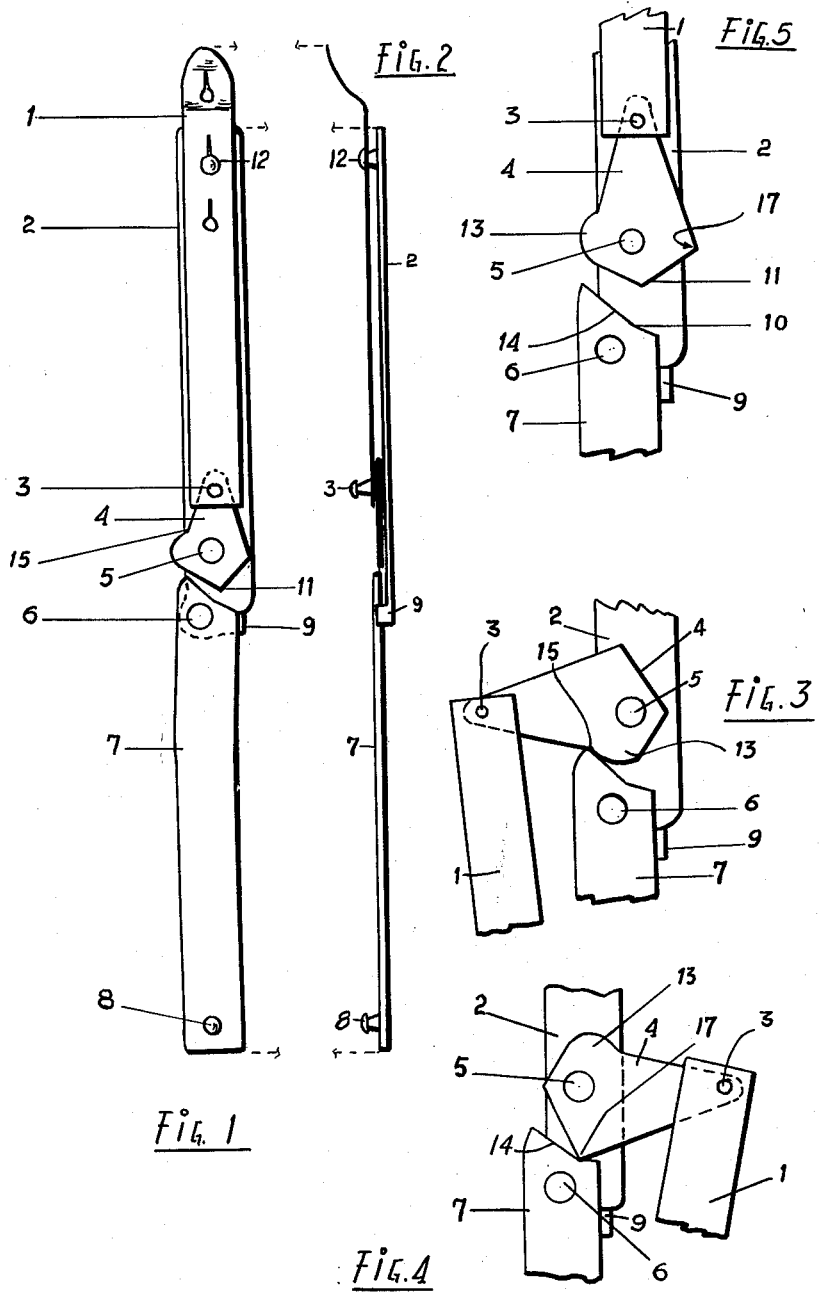
Inventor
CANDIDO REYES TERRON
By
Kurt Kelman
AGENT

United States Patent Office 3,187,347
Patented June 8, 1965

3,187,347
JOINT ARRANGEMENT WITH MULTI-POSITIONAL LOCKING MEANS FOR A PROSTHETIC SURGICAL APPLIANCE
Candido Reyes Terron, 13 Nunez de Balboa St., Madrid, Spain
Filed May 11, 1962, Ser. No. 194,014
Claims priority, application Spain, June 9, 1961, 87,656
9 Claims. (Cl. 3—26)

This invention relates to surgical prosthetic appliances, and more particularly to a joint arrangement in a prosthetic appliance which is intended to replace an articulated limb.

In its more specific aspects, the invention has for its object the provision of an artificial knee joint which is versatile in the range of movements which it permits to two structural members which respectively replace portions of a leg above and below the knee joint.

Another object of the invention is the provision of a joint arrangement which is sturdy and durable in its structure, and has few moving parts.

With these and other objects in view, the invention in its basic aspects includes the two structural members to be joined and a hinge which connects them for rotation about the hinge axis. Fixed abutments on the two members cooperate to prevent rotation of the members in one direction beyond a predetermined position, normally a stretched position. A locking member is mounted on one of the two structural members and is rotatable thereon about an axis. A resilient fastening means alternatively urges the locking member into three angular positions relative to the last-named axis. In the first position, the locking member engages the other structural member and prevents rotation of the structural members relative to each other in a direction away from the stretched position. In its second position, the locking member engages the other structural member under the resilient urging of the fastening means and opposes movement of the structural members away from the stretched position. In the third position, the locking member is not in contact with, and is spaced from, the other structural member so that the structural members may rotate freely, as far as permitted by the above-mentioned fixed abutments.

Other features and the attendant advantages of this invention will be readily appreciated, as the same becomes better understood by reference to the following detailed description of a preferred embodiment when considered in connection with the accompanying drawing in which:

FIG. 1 shows portions of a knee joint arrangement of this invention in front elevation;

FIG. 2 is a side-elevational view of the joint arrangement of FIG. 1;

FIGS. 3 to 5 are enlarged detail views of the arrangement of FIG. 1 in three different operative positions of the joint.

Referring now to the drawing in detail, and initially to FIGS. 1, 2 and 5 which illustrate the joint arrangement in the unlocked condition, there are seen two flat elongated structural members 2, 7 of a prosthetic leg appliance not otherwise shown. They are connected by a hinge pin 6 for flexure of the appliance, as in a knee joint.

A locking member 4 is rotatable on the structural member 2 about a pin 5 the axis of which is parallel to that of the pin 6. The locking member 4 is a plate having the approximate shape of a deltoid, the pin 5 being centered near the intersection of the diagonals of the deltoid shape. The locking member 4 thus constitutes a two-armed lever the arms of which extend in the direction of the diagonal which would be in the plane of symmetry if the shape of the plate member 4 were truly that of a deltoid.

A lug 3 projects from the locking member 4 near the free end of the longer lever arm and rotatably engages a corresponding opening in one end portion of a strap 1 consisting of a strong resilient rubber composition. The other end portion of the strap 1 has three key-hole shaped longitudinally spaced openings the middle one of which is shown in FIGS. 1 and 2 to be engaged with a lug 12 projecting from the terminal portion of the structural member 2 remote from the hinge pin 6. The strap thus resiliently holds the locking member 4 is an unlocked position in which the lever arms of the locking member are parallel to the direction of elongation of the member 2 and the shorter lever arm 11 faces the member 7. The force with which the strap 1 urges the locking member 4 into this position can be varied by engaging one of the other holes in the strap 1 with the lug 12.

The other structural member 7 also is provided with a projecting lug 8 on its terminal portion remote from the hinge pin 6. The strap 1 may be released manually from the lug 12 and swung counterclockwise or clockwise from the position shown in FIG. 1 until one of its holes may be slipped over the lug 8 while the strap is under elastic tension. The two resulting positions of the locking member 4 are shown in FIGS. 3 and 4 respectively, whereas the third or unlocked position in which the strap 1 is fastened to the lug 12 in the manner described above is illustrated on a larger scale in FIG. 5.

The two corners of the locking member 4 which correspond to the two equal angles in a true deltoid are shaped differently from each other. In one corner 17, two straight sides of the plate member meet at an angle which is slightly greater than 90° to form an edge elongated in the direction of the thickness of the locking member 4, that is, parallel to the axes of the pins 5 and 6. The opposite corner 13 is bulged outwardly in an arc the center of curvature of which is near the axis of the pin 5. The juncture of the arc with one of the longer sides of the plate 4 forms a notch 15.

The transverse edge face 14 of the structural member 7 opposite the locking member 4 is of wide open V-shape and generally oblique relative to the direction of elongation of the member 7. The edge face 14 has two substantially straight portions which meet at the apex 10 of the V-shape which is nearest the axis of the hinge pin 6. The two straight edge portions define an obtuse angle only slightly smaller than 180°.

As best seen from FIG. 2, a stop 9 projects in the common direction of the axes of pins 5, 6 from the structural member 2 and abuts against a cooperating longitudinal edge portion of the structural member 7 when the members are in the position illustrated in all figures of the drawing. Clockwise movement of the member 2 from the position shown is prevented by the abutting engagement of the stop 9 with the corresponding portion of the member 7.

The afore-described apparatus operates as follows:

When the strap 1 is secured to the structural member 7 in the manner illustrated in FIG. 3, the member 2 is prevented from moving clockwise on the member 7, as viewed in FIG. 3, by the abutment of the stop 9 against the edge of the member 7. Counterclockwise movement of the member 2 is prevented by face-to-face abutment of the arcuately shaped corner portion 13 of the plate 4 against one of the straight portions of the edge face 14.

As clearly seen in FIG. 3, the forces exerted on each other by the engaged portions of the edge face 14 and of the corner portion 13 are directed approximately radially relative to the axis of the pin 5 and approximately circumferentially relative to the axis of the pin 6. Any attempt at rotating the member 2 counterclockwise from the position shown in FIG. 3 thus causes little stress or no stress at all in the strap 1. The strap merely urges the plate 4 into a position defined by engagement of the notch 15 on tht plate 4 by the edge of the member 7 at which the transverse face 14 meets one of the longitudinal side faces of the member 7.

In the first locked position of the joint arrangement shown in FIG. 3, the two members 2 and 7 are thus secured against relative rotation and move as a rigid unit.

The second locked position of the joint arrangement is illustrated in FIG. 4. In this position, the locking member 4 is pivoted about 180° from the position shown in FIG. 3 but the strap 1 is fastened to the lug 8 in the same manner as in the first position. The rounded corner of the plate 4 is facing away from the edge face 14 of the member 7 and the corner 17 is urged into engagement with the apex 10 of the face 14 by the resilient tension of the strap 1. In the absence of external forces, the joint arrangement assumes the position illustrated in FIG. 4. Rotation of the member 2 in a clockwise direction from the position of FIG. 4 is prevented by the stop 9. Counterclockwise movement is opposed by the resilient force of the strap 1 and prevented by abutment of the shorter lever arm of the locking member 4 against one of the straight portions of the face 14 after relative movement of the members 2, 7 through a small acute angle which is a portion only of the difference of the obtuse angles respectively defined by the two straight portions of the face 14 and by the two sides of the locking member 4 which meet at the corner or edge 17.

In the second locking position illustrated in FIG. 4, the joint arrangement of the invention permits limited movement of the structural members 2 and 7 against a resilient force which urges them into the fully stretched position of the leg appliance.

In the third or unlocked position of the joint arrangement illustrated in FIGS. 1 and 5, the locking member 4 is so far removed from the structural member 7 as to permit free movement of the two structural members 2, 7 within the limits required in normal walking.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed is:

1. A joint arrangement for a prosthetic appliance comprising, in combination:
    (a) two structural members;
    (b) hinge means connecting said members for rotation about a fixed first axis
    (c) fixed abutment means on said structural members for preventing rotation thereof in a first direction from a predetermined relative position thereof;
    (d) a locking member rotatable about a second axis on one of said structural members between three angularly spaced positions, the other one of said structural members having an abutment face, said locking member having
        (1) first engaging face means abuttingly engaging said abutment face when said locking member is in a first position thereof and said structural members are in said predetermined position thereof for preventing rotation of said structural members in a second direction opposite to said first direction, and
        (2) second engaging face means spaced from said first engaging face means and abuttingly engaging said abutment face when said locking member is in a second position thereof for limiting relative rotation of said structural members from said predetermined position thereof in said second direction to a predetermined angle,
        (3) said first and second face means of said locking member being spaced from said abutment face when said locking member is in the third position thereof; and
    (e) yieldably resilient means for selectively urging said locking member toward said three positions thereof, and for urging said locking member into abutting engagement of the respective face means thereof with said abutment face when said locking member is in said first position and in said second position thereof.

2. A joint arrangement as set forth in claim 1, wherein said first engaging face means is urged into engagement with said abutment face by said resilient means in a direction substantially circumferential with respect to said first axis and substantially radial with respect to said second axis when said locking member is being urged by said resilient means toward said first position thereof.

3. A joint arrangement as set forth in claim 1, wherein said second engaging face means of said locking member and said abutment face of said other structural member constitute a pair of engageable elements, one of the elements of said pair being formed with a notch, and the other element of the pair having an edge, said edge engaging said notch under the urging of said resilient means when said locking member is in one of said first and second positions thereof.

4. A joint arrangement as set forth in claim 1, wherein said resilient means includes an elongated resilient member having one end portion fastened to a portion of said locking member spaced from said second axis; and means on each of said structural members for alternatively securing the other end portion of said elongated resilient member to said structural members under longitudinal tension.

5. A joint arrangement as set forth in claim 4, including means for varying the longitudinal tension in said resilient member.

6. A joint arrangement as set forth in claim 1, wherein said other structural member is elongated and the abutment face thereof is transverse of the direction of elongation thereof, said face being substantially V-shaped, the apex of the V-shape being nearer said first axis than the remainder of said transverse face, and the second engaging face means of said locking member includes an edge portion, said edge portion engaging said apex under the urging of said resilient means when said locking member is in said second position thereof and said structural members are in said predetermined position.

7. A joint arrangement as set forth in claim 1, wherein said locking member constitutes a lever having a longer arm and a shorter arm, and said resilient means includes an elongated resilient member having one end portion fastened to a portion of said longer arm spaced from said second axis; and means on each of said structural members for alternatively securing the other end portion of said elongated resilient member to said structural member under longitudinal tension, said shorter arm facing said other member when said resilient member is fastened to said one structural member.

8. A joint arrangement as set forth in claim 1, wherein said axes are parallel.

9. A joint arrangement as set forth in claim 8, wherein said first engaging face means includes a face portion arcuate about said second axis, and another face portion angularly offset from said arcuate face portion and defining therewith a peripheral notch in said locking member, said abutment face engaging said notch and radially abutting against said arcuate face portion when said locking member is in said first position thereof; wherein said second engaging face has two face portions angularly offset at an angle greater than 90° and jointly defining an edge; and wherein said abutment face has two portions angularly offset at an angle greater than the angle of the two face portions of said second engaging face means, but smaller than 180°, said portions of said abutment face defining a groove, said edge engaging said groove when said locking member is in said second position thereof.

References Cited by the Examiner
UNITED STATES PATENTS

| | | | |
|---|---|---|---|
| 1,785,343 | 12/30 | Gilbert | 287—99 |
| 2,433,570 | 12/47 | Markkula | 128—80 |
| 2,559,473 | 7/51 | Slodek | 128—80 |

RICHARD A. GAUDET, *Primary Examiner.*